United States Patent

[11] 3,615,594

| [72] | Inventors | Aubrey P. Stewart, Jr.<br>801 Grove Ave.;<br>Jim C. Gregory, 17th & Grove, both of<br>Corning, Iowa 50841 |
|---|---|---|
| [21] | Appl. No. | 728,828 |
| [22] | Filed | May 13, 1968 |
| [45] | Patented | Oct. 26, 1971 |

[54] VARIEGATING SAUCE BASE
5 Claims, No Drawings

[52] U.S. Cl. .................................................. 99/136,
99/1, 99/132
[51] Int. Cl. ............................................. A23g 5/00,
A23l 1/04, A23l 1/06
[50] Field of Search ........................................... 99/132,
144, 136

[56] References Cited
UNITED STATES PATENTS

| 1,898,336 | 2/1933 | Boyles ...................... | 99/132 |
| 2,550,656 | 4/1951 | Knechtges ................. | 99/132 X |

OTHER REFERENCES

Kertesz, The Pectic Substances, Interscience Pub. Inc., New York, 1951, pp. 473 and 563.

Primary Examiner—Raymond N. Jones
Assistant Examiner—J. M. Hunter
Attorney—Jonathan Plaut ABSTRACT: Aqueous base consisting of 1.5–3 percent pectin, 0.6–1.2 percent food acidulant, 8–21 percent sugar and 15–25 percent flavoring agent gels at ambient temperature upon subsequent mixing with sugar syrup to provide a variegating sauce for food products with viscosity in the range $8 \times 10^4$ cps–$1 \times 10^5$ cps. The base can be sterilized and aseptically packaged for distributing and storing prior to use.

VARIEGATING SAUCE BASE

BACKGROUND OF THE INVENTION

This invention relates to variegating sauces for food products, and in particular to a sauce base which allows for cold addition of the sugar syrup ingredient at a point removed in both location and time from the preparation of the base.

Variegating sauces for food products consisting of a pectin ingredient, an acid ingredient, a flavor ingredient, water and sugar syrup are known in the prior art. Heretofore, the sugar syrup has been added to the other base ingredients at the time of the formulation of the entire variegating sauce, under high-temperature (cooking) conditions, for example about 212° F. Heat has been required to enable the sugar to dissolve and gel to form.

In the prior art, the addition of the sugar serves to inhibit, at least to some extent, microbiological growth. Therefore, in many cases, the base with sugar added is not sterilized. However, microbiological growth is not completely inhibited by the addition of sugar and, since the sugar accounts for approximately 70 percent of the mass of the variegating sauce, the sauce with sugar added provides a substantial problem as to the shipping thereof because of its bulk.

SUMMARY OF THE INVENTION

The variegating sauce base of the instant invention comprises the following ingredients in the proportions indicated:

| | |
|---|---|
| Pectin | 1.5–3% |
| Sugar | 8–21% |
| Acidulant | 0.6–1.2% |
| Fruit and/or Fruit flavoring | 15–25% |
| Water | 60–70% |

Bases of this composition readily gel at ambient temperature upon subsequent mixing with a sugar syrup to provide high quality variegating sauces which may be used with food products in the standard manner. The base may be sterilized and aseptically packaged to facilitate shipment and storage thereof prior to use.

DETAILED DESCRIPTION OF THE INVENTION

It has been found that formulating a variegating sauce base of pectin, acidulant, sugar, fruit and/or fruit flavoring with water in prescribed proportions permits the later addition of sugar syrup at ambient temperature to provide a final sauce of normal jamlike consistency. Deviating from these prescribed proportions results in a base which will not gel with the sugar syrup at noncooking temperatures.

Between about 1.5 percent and 3.0 percent pectin, preferably of the rapid set type, is employed in the sauce base of this invention. Use of less than 1.5 percent pectin results in a base which will not gel with added sugar syrup at ambient temperature conditions. In a preferred embodiment of the instant sauce bases, about 2.3 percent pectin is used.

For the purposes of this invention, any sufficiently soluble food acidulant might be employed, for example malic acid, citric acid, succinic acid and the like. The actual acidulant selected is a matter of choice depending in part upon the flavoring agent used and the taste and acidity characteristics of the acidulant. Malic acid is ordinarily suitable and is preferred acidulant, but it might be replaced by citric acid or other available acidulant if desired. The acidulant must be present in the base at a concentration between about 0.6 percent and 1.2 percent in order to obtain gelatin in the final sauce. Preferably the acidulant will be used at about a 1.0 percent level.

Separate sugar, other then that used in the syrup, should be added to the base in order to facilitate subsequent gelation. Sugar level in the base should not be less than 8 percent or higher than 21 percent. At sugar levels of less than 8 percent the base will not form a gel of high enough viscosity when mixed with syrup. At sugar levels of higher than 21 percent, premature gelation of the base will occur. Preferably about 18 percent of this separate sugar will be used. Granulated sugar is conveniently used for this purpose.

The fruit and/or fruit flavoring to be used in the base may be any of the commonly used flavors in variegating sauces, for example strawberries or raspberries. It should be present in an amount of between 15 percent to 25 percent, preferably about 18 percent. If an excess of this flavoring agent is used gelation will not occur.

The proportion of ingredients used in the bases of the instant invention is not a matter of choice which is obvious to one skilled in the art. It has been found that selection of ingredients within these critical limits permits cold addition of sugar syrup.

Other ingredients which do not interfere with the gelation process might be added to the base compositions of this invention, for example coloring agents.

The precise manner of blending these ingredients into the aqueous base compositions of this invention is usually not critical to obtaining an acceptable base. It is convenient to make a dry blend of the pectin and granulated sugar prior to adding these ingredients to the mixture. Flavoring agent might be blended with the water either before or after the addition of the dry blend. Agitation of the base mixture is conveniently employed to facilitate dissolving the soluble ingredients, and the mixture is also heated for this purpose; however, excessive heating is to be avoided due to its deleterious effects on the flavor quality of the resulting base.

Usually the base will be sterilized after formulation and then aseptically packaged. This procedure permits final formulation of the sauce at a point removed in time and place from the formulation of the base itself. A minimum of heat is used for the sterilization in order to preserve the flavor qualities of the base. The aseptically packaged, sterilized base formulation may then be distributed and stored, with the sugar syrup added later at a convenient time and place. By following this procedure, no microbiological growth will occur during the interim and neither refrigeration nor other preservative considerations are required.

When the base is to be formulated into the final variegating sauce, a syrup containing a gelling amount of sugar is blended with the base at ambient temperature conditions and the final mixture allowed to stand until gelation occurs. The amount of sugar required to afford gelation will vary according to the particular proportions of base ingredients used. However, the amount of sugar syrup added should be sufficient to provide a total sugar content for the final variegating suace between about 30 percent and 60 percent. Preferably, the total sugar content of the sauce would be approximately 53 percent. Blends of sucrose and, for example corn syrup, may be used for this purpose, although it is customary to use a sugar syrup containing about 66 percent sucrose. When this 66 percent sucrose syrup is used, it will usually be added to the base in an amount to provide a base:syrup ratio between about 1:1 and 3:17 on a volume basis. Preferably a base:syrup ratio of 3:7 by volume will be used to provide the most advantageous total sugar content in the final sauce. By blending the base and the syrup according to these proportions, the final sauce will thus contain pectin in an amount between about 0.2 percent –1.4 percent, preferably about 0.6 percent, and an acidulant in an amount between about 0.08–0.55 percent, preferably about 0.27 percent. When the syrup and base are blended in the above proportions, the blending may be advantageously performed at ambient temperature, in which event the final sauce will gel within a time between a few minutes and 1 hour to a viscosity in the range of $8\times10^4$ cps – $1\times10^5$ cps. This sauce may then be added to ice cream or other food products in accordance with procedures well known to those skilled in the art.

The following examples are provided to illustrate the present invention more fully. They are not to be construed as defining the invention, which is limited only be the appended claims.

EXAMPLE I

Into 60.5 ml. of water was blended 18.1 g. of strawberries. A dry blend of 2.3 g. pectin and 18.1 g. granulated sugar was then added to the mixture, followed by 1.0 g. malic acid. During the addition of ingredients, the mixture was vigorously agitated with a minimum of heating to dissolve the soluble ingredients. The base was then sterilized by heating to 230° F. for approximately 1 minute, and then cooled to room temperature and aseptically packaged.

The sterile base was mixed with a 66.5 percent sucrose syrup at room temperature in an amount to provide a base:syrup ratio of 3:7 by volume. Upon standing, the mixture gelled to a final sauce of viscosity $1 \times 10^5$ cps.

EXAMPLE II–III

Variegating sauce bases of the following compositions were prepared according to the procedure of Example I:

|            | II    | III  |
|------------|-------|------|
| Pectin     | 2.05  | 2.7  |
| Malic Acid | 1.20  | 1.0  |
| Sugar      | 16.45 | 21.0 |
| Flavor     | 18.5  | 17.3 |
| Water      | 62.5  | 58.0 |

Upon mixing these bases with 66.5 percent sucrose syrup in the manner described in Example I, a final sauce was obtained with viscosity in the range $8 \times 10^4$ cps–$1.0 \times 10^5$ cps.

EXAMPLE IV

The procedure of Example I is repeated wherein citric acid is used in place of said malic acid with substantially similar results obtained thereby.

What is claimed is:

1. An aqueous base comprising pectin in an amount between about 1.5 percent and 3.0 percent, food acidulant in an amount between about 0.6 percent and 1.2 percent, sugar in an amount between about 8 percent and 21 percent, flavoring agent in an amount between about 15 percent and 25 percent and water in an amount between about 60 percent and 70 percent whereby upon addition of cold sugar syrup in an amount sufficient to provide a total sugar content of 30 percent to 60 percent a variegating sauce is formed.

2. A base as in claim 1 wherein said food acidulant is malic acid.

3. A base as in claim 1 wherein said food acidulant is citric acid.

4. A base as in claim 1 additionally characterized by being sterile.

5. An aqueous base comprising about 2.3 percent pectin, about 1.0 percent malic acid, about 18 percent sugar, about 18 percent fruit flavoring agent and about 60.7 percent water whereby upon addition of cold sugar syrup in an amount sufficient to provide a total sugar content of 30 percent to 60 percent a variegating sauce is formed.

* * * * *